United States Patent [19]

Rogers, Jr.

[11] E Re. 30,802

[45] Reissued Nov. 24, 1981

[54] METHOD OF SECURING A SLEEVE WITHIN A TUBE

[75] Inventor: George D. Rogers, Jr., Enfield, Conn.

[73] Assignee: Combustion Engineering, Inc., Windsor, Conn.

[21] Appl. No.: 14,654

[22] Filed: Feb. 22, 1979

Related U.S. Patent Documents

Reissue of:

[64] Patent No.: 4,069,573
Issued: Jan. 24, 1978
Appl. No.: 670,932
Filed: Mar. 26, 1976

[51] Int. Cl.[3] ..... B23P 17/02

[52] U.S. Cl. ..... 29/421 R; 29/157.3 C; 29/523; 138/98; 29/402.09

[58] Field of Search ..... 29/421 R, 157.3 C, 157.4, 29/401 D, 402, 401 R, 523, 234; 138/97, 98; 156/94; 72/370, 54, 58, 59

[56] References Cited

U.S. PATENT DOCUMENTS

| | | | |
|---|---|---|---|
| 249,783 | 11/1881 | Morgan | 138/98 |
| 1,471,184 | 10/1923 | Miles | 138/97 |
| 1,930,745 | 10/1933 | Fisher | 72/62 |
| 2,228,139 | 1/1941 | Leonhardy | 29/523 |
| 2,460,580 | 2/1949 | Huber | 29/421 |
| 2,704,104 | 3/1955 | Mueller | 72/523 X |
| 2,756,779 | 7/1956 | Tratzik et al. | 138/97 |
| 2,773,538 | 12/1956 | DeMers | 72/59 |
| 2,784,627 | 3/1957 | Mueller et al. | 138/97 X |
| 2,857,660 | 10/1958 | Staples | 29/157.3 |
| 2,893,465 | 7/1959 | Mueller et al. | 29/421 X |
| 2,954,064 | 9/1960 | DeMers | 29/523 X |
| 3,643,701 | 2/1972 | Wadiak et al. | 138/97 |
| 3,885,298 | 5/1975 | Pogonowski | 29/523 X |

FOREIGN PATENT DOCUMENTS

| | | |
|---|---|---|
| 801888 | 1/1951 | Fed. Rep. of Germany . |
| 1083774 | 12/1960 | Fed. Rep. of Germany . |

*Primary Examiner*—Leon Gilden
*Attorney, Agent, or Firm*—Edward L. Kochey, Jr.

[57] ABSTRACT

A method is disclosed for securing a repair sleeve within a tubular fluid conveying conduit. The sleeve is positioned within the tube so that it extends coextensive with a region of degraded tube wall and partially beyond the axial extremes of the degraded area. A radially outwardly directed force is then applied to the tubular sleeve from within along a portion of the sleeve at each end, extending beyond the degraded area. The force is sufficient to cause outward plastic deformation of both the sleeve and the tube resulting in an interference mechanical joint therebetween.

7 Claims, 3 Drawing Figures

METHOD OF SECURING A SLEEVE WITHIN A TUBE

Matter enclosed in heavy brackets [ ] appears in the original patent but forms no part of this reissue specification; matter printed in italics indicates the additions made by reissue.

BACKGROUND OF THE INVENTION

The invention relates generally to a method and apparatus for securing a tubular sleeve coaxially within a fluid conduit.

There exists, in a variety of embodiments, fluid conduits which themselves are surrounded by a fluid environment. One such example is that of a tube and shell heat exchanger wherein a first fluid is contained within the fluid conduit and a second fluid surrounds the exterior of the conduit such that heat exchange between the two fluids is effected. Such fluid conduits may from time to time develop leaks due to rupturing of the conduit wall, which may occur due to initial imperfections or through subsequent deterioration of the conduit. The resulting leak permits fluid communication between the first and second conduits which may not always be tolerable. Such would be the case if the two fluids in combination reacted violently or if one fluid would introduce some undesirable property to the second fluid. An example of this latter problem arises in the steam generating heat exchangers associated with pressurized water nuclear steam supply wherein the fluids are at substantially different pressures and one fluid contains radioactivity while the other does not. For these reasons, continued, large amounts of fluid communication between the two fluids through a leak in the tube must be prevented.

When the fluid conduits are readily accessible, a variety of techniques may be employed to repair the ruptured conduit directly or to install a sleeve device or a plug into the conduit which stops the leak or completely isolates the entire conduit from a fluid source. However, in some environments, including that of a nuclear heat exchanger, it may be difficult for reasons of inaccessibility or biological hazard to effect such repairs. In such instances, techniques have been developed for plugging the fluid conduits from a remote location and thus totally removing them from service. Either rolling, explosive expansion and/or welding have been used to secure plugs in the tube ends. Rolling and welding are rather difficult to apply as remote operation and explosive expansion has emerged as the most viable means of plugging tubes by remote operation.

A serious drawback to plugging both ends of a heat exchanger tube is that eventually as more and more tubes are plugged the capacity of the steam generator becomes less and less. Plugging requires removing an entire tube from operation when in general only a small localized zone of the tube is involved in the leak. Attempts have been made to install sleeving within the tube to isolate the portion of the tube which has degraded thereby stopping the leak. Previous sleeving development work has been primarily concerned with obtaining an absolutely leak proof joint by brazing, arc welding, explosive welding, or some other means. All of these metallurgical bonding techniques have problems which are not immediately amendable except in very closely controlled laboratory situations. This is due to the need for cleanliness, close fittings, heat application and atmosphere control.

SUMMARY OF THE INVENTION

The present invention relates to a method of forming an interference mechanical joint for securing a coaxially disposed tubular sleeve within a conduit. The tubular sleeve is first inserted into an open end of the conduit and moved to the desired location therein. A radially outwardly directed force is then applied from within the tube along a selected axial portion thereof. The magnitude of the force is sufficient to cause the portion of the sleeve to which it is applied to expand outwardly into contact with the inner wall of the conduit and to continue expanding a predetermined amount to expand the surrounding conduit, resulting in the desired interference mechanical joint.

One particularly advantageous application of the invention permits repair of a metal tube having a degraded wall section. A tubular metal sleeve is selected having a length greater than the axial extent of the degraded wall section. The sleeve is positioned within the tube with a portion extending beyond the degraded section at each end. An interference mechanical joint is then formed at each end of the sleeve/tube in the portion of the tube extending beyond the degraded section. The sleeve, so mounted isolates the degraded section from flow within the tube and further substantially increases the axial strength of the tube in this region.

DETAILED DESCRIPTION OF THE INVENTION

Figure 1:
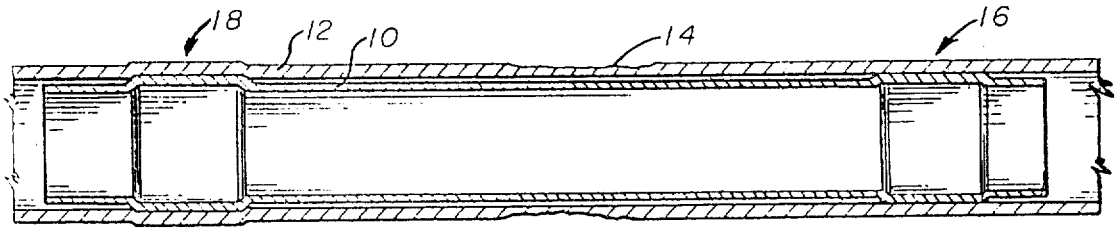
FIG. 1 is a sectional view showing a tubular sleeve secured with a fluid conduit in a manner according to the principles of the invention.
Figure 2:
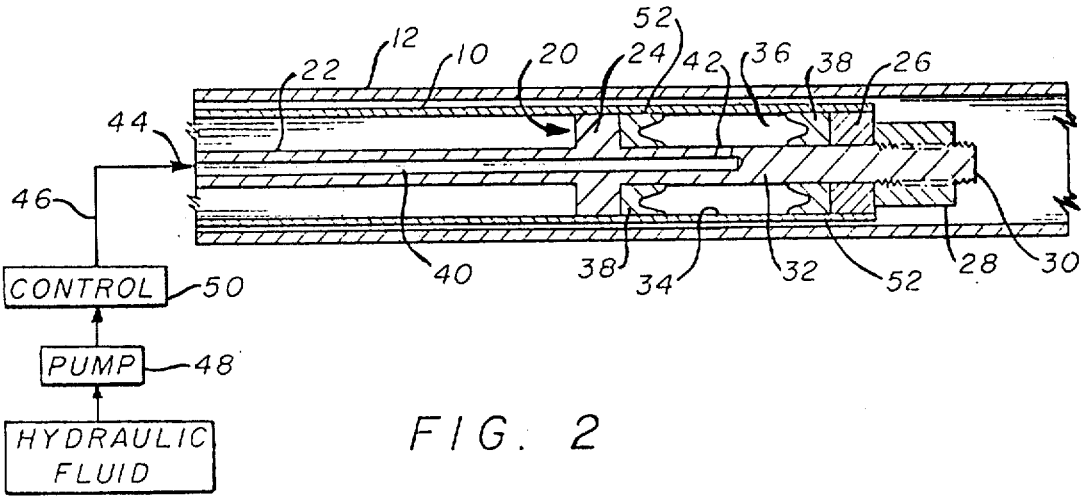
FIG. 2 illustrates a hydraulic apparatus for applying a radially outwardly directed force to a portion of the interior wall of the sleeve/tube according to the invention.
Figure 3:
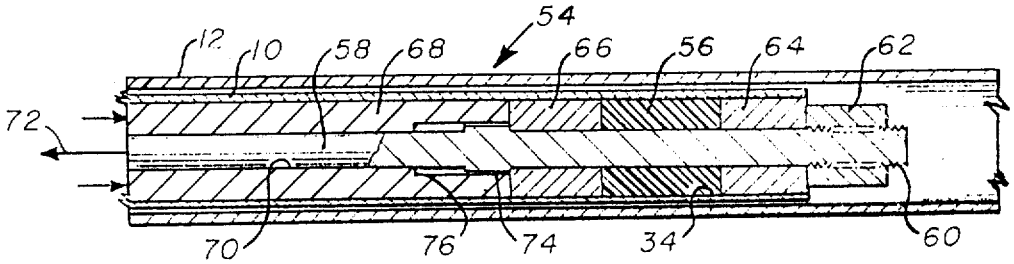
FIG. 3 illustrates a mechanical apparatus for performing the same function as the apparatus of FIG. 2 by applying a compressive force to an elastomeric material.

Referring first to FIG. 1, a sleeve 10 is shown positioned within a fluid conduit 12 having a region of degradation 14 in the exterior wall thereof. This figure shows the joint of the invention at an intermediate stage on the right side and, on the left side, after it has been secured within the tube by application of internal radially extending pressure on the interior wall of the sleeve. FIGS. 2 and 3 illustrate two alternate embodiments of apparatus which permit remote application of the necessary internal force upon the sleeve to cause the sleeve and the tube to expand outwardly to form an interference mechanical joint.

Referring back now to FIG. 1, the method of securing the repair sleeve 10 within the tube 12 will be described in greater detail. The outer diameter of the repair sleeve is somewhat smaller than the inner diameter of the tube being repaired permitting the sleeve to be easily inserted within the tube and moved axially therealong to a desired position with the ends thereof extending beyond the degraded area which it is desired to isolate from the fluid flow within the conduit. As pointed out above, upon close inspection of FIG. 1 it will be noted that the joint 16 on the right side illustrates an intermediate step in the securing of the sleeve within the tube wherein the sleeve has been expanded into contact with the inner wall of the tube, however, the tube wall itself has not yet been expanded to form the final interference mechanical joint as illustrated by the joint 18 on the left end.

Once the sleeve is positioned in the desired location within the tube suitable means are used to apply a radially outwardly directed force from within the tubular sleeve, first at one end and then at the other end of the tube to cause the sleeve to expand radially outwardly first, into contact with the inner wall of the tube and then to further expand along with the tube resulting in a mechanical interference. Because the sleeve and the tube have essentially equivalent elastic constants and, accordingly the outer tube is stressed to the same level as the sleeve, a slight mechanical clearance may exist between the sleeve and the tube at the joint. As a result, the joint will not obtain absolute leak tightness but will limit the leakage thereby to a very small amount estimated at less than 100 cc's per minute. The sleeve will provide mechanical strength in the axial direction capable of preventing separation of the tube in the degraded area should the tube wall fail completely.

In a typical application, a $\frac{3}{4}$ inch outside diameter Inconel 600 tube of the type commonly used in a nuclear steam generator having a wall thickness of 0.048 inch is provided with a $\frac{5}{8}$ inch outside diameter having a 0.032 inch thickness wall also made from Inconel 600. The sleeve length is selected so that it extends beyond the degraded area by an amount required to provide for inaccuracies in axial location. Internal pressure is then applied to a limited portion of one end of the sleeve to cause expansion of the sleeve and the tube together to form the desired interference mechanical joint. Internal pressures of 14,000 to 15,000 psig are necessary in order to obtain the desired expansion of the tube and sleeve described above as will be described more fully hereinafter in connection with apparatus for imparting the necessary radially directed pressure.

Turning now to FIG. 2, hydraulic apparatus 20 is shown for applying the radially outwardly directed force necessary to cause the expansion joint. The apparatus is shown positioned adjacent to the end of a sleeve 10 which has been positioned in the desired axial location within the outer tube 12. The apparatus comprises a center mandrel 22 having a fixed stop 24 and a movable stop 26. The fixed stop 24 comprises a radially enlarged section of the mandrel which is sized to fit closely with the inner diameter of the sleeve 10. The movable stop 26 comprises an annular ring having an outer diameter the same as that of the fixed stop and an inner diameter permitting a close tolerance sliding fit on the outer diameter of the mandrel. The end of the mandrel extending into the sleeve is provided with a threaded nut 28 which engages mating threads 30 on the mandrel and which is used to adjust, within limits, the position of the movable stop 26 axially with respect to the mandrel 22. The fixed and the movable stop along with the section 32 of the mandrel extending therebetween and the interior wall 34 of the sleeve 10 cooperate to define an annular chamber 36 in fluid communication with the inner wall of the sleeve. A pair of opposed "U"-cup seals 38 are positioned about the mandrel within the chamber 36 and are situated with their flat annular surface 40 abutting the fixed stop and the movable stop and their "U"-shaped cross section in fluid communication with the annular chamber. The "U"-cup seals 38 are the primary hydraulic fluid sealing elements and act positively with pressure, i.e., as internal pressure is increased, their sealing effect increases. The mandrel is provided with an axially extending hydraulic passageway 40 through the center thereof which terminates within the mandrel adjacent to the annular chamber 36. A second passageway 42 substantially perpendicular to the first extends from the end of the first passageway through the mandrel wall to provide fluid communication between the first hydraulic passageway and the annular chamber 36. A suitable hydraulic fitting 44 at the end of the mandrel connects to a tube 46 supplying a suitable hydraulic fluid from a positive displacement pump 48. A predetermined fixed volumetric input of hydraulic fluid controlled by control means 50 following application of an initial set pressure, determines the maximum diameter of expansion of the joint. As an example, for the $\frac{3}{4}$ inch O.D. tube and $\frac{5}{8}$ inch O.D. sleeve described above the pressure required to plastically expand the sleeve into contact with steam generator tube I.D. is 6000 to 7000 psig. The pressure is then increased while applying the fixed volumetric input to a peak of 14,000 psig to 15,000 psig to expand both tubes to the final configuration. For a one inch long expanded zone in the above example a final volumetric input of 1 cc results in a final diameter expansion of the outer tube of $0.025 \pm 0.005$ inch.

In order to obtain a good seal at the outer surface 52 of the "U"-cup seals, the interior wall 34 of the sleeve 10 is provided with a smooth surface, usually 16 micro inch RMS or better is sufficient to provide a good substantially leakproof seal while the hydraulic pressure is being applied. It has also been found that to prevent damage to the seals during assembly it is desirable to provide lead in chambers and a seal lubricant to improve ease of assembly.

Referring now to FIG. 3, a mechanical expanding apparatus 54 is shown wherein an annular elastomer plug 56 is caused to expand within a sleeve 10 thereby causing expansion of the sleeve and tube to form the desired interference mechanical joint. The apparatus comprises an elongated mandrel 58 threaded at one end 60 and having an adjusting nut 62 engaging said end for adjusting the axial position of a movable stop 64. The movable stop comprises an annular ring whose inside diameter and outside diameter are in relatively close tolerance engagement with the mandrel 58 and the inner wall 34 of the sleeve 10, respectively. A fixed stop 66 identical in structure to the movable stop is positioned on the mandrel 58 axially spaced from the movable stop 64 to define an annular chamber within which the annular elastomer plug 56 is retained. The fixed stop 66 is maintained in the desired position within the sleeve 10 by means of an elongated reaction tube 68 which is held in a fixed position by means external to the tube and not shown in the drawing. The reaction tube has a central opening 70 therethrough through which the mandrel extends. Once the mandrel assembly is inserted into a sleeve/tube arrangement in the desired position as shown in FIG. 3 a hydraulic ram or other mechanical means not shown but represented by arrow 72 is used to pull upon the mandrel and force the movable stop or piston 64 and mandrel toward the stationary stop or piston 66. The axial motion increases pressure on the elastomer plug 56 which, when confined, acts similar to a fluid in exerting uniform outwardly directed pressure on the sleeve and tube.

The permissible axial movement of the mandrel, and as a result the total expansion of the elastomer 56 is limited to a predetermined amount by a mechanical stop comprising an enlarged diameter section 74 upon the mandrel which defines an annular shoulder engages a hard stop 76 comprising a second annular shoulder provided in the fixed reaction tube 68.

For the ¾ inch O.D. tube and ⅝ inch O.D. sleeve described above a mandrel 58 having a shaft diameter of 5/16 inch has been used with a urethane plug having an I.D. of 5/16 inch and an O.D. 9/16 inch to fit within the sleeve. A typical material for the plug is a cast urethane such as a product of the Acushnet Co., available under the trade name of Elastocast Urethane.

With this material axial forces (72) of around 3,000 lbs. are required to obtain a forming pressure on the elastomer plug of 15,000 psi. The diametral clearances between the stops or pistons 64, 66 and the sleeve inner wall 34 and the mandrel are on the order of 0.001 inch to prevent extrusion of the elastomer at the high forming pressures obtained.

It will be obvious to one skilled in the art that two or more hydraulic chambers and elastomeric expanders may be assembled on a common mandrel and accordingly have the capability of forming more than one expansion joint in one operation. While such arrangements are not shown or described in detail herein they are intended to fall within the scope of the invention.

Further, while this preferred embodiment of the invention has been shown and described, it should be understood that it is merely illustrative and that changes may be made without departing from the scope of the invention as claimed.

What is claimed is:

1. A method of securing a coaxially disposed tubular sleeve within a fluid conduit comprising the steps of:

a. inserting said sleeve into an open end of said conduit;

b. positioning said sleeve in a desired axial position with respect to said conduit;

c. applying a radially outwardly directed uniform force from within said sleeve along a selected axial portion thereof having a magnitude sufficient to cause said portion of sleeve to expand outwardly into contact with the inner wall of said conduit, *but not sufficiently to permanently increase the outer diameter of said fluid conduit*; and d. applying [an] *a second* additional radially outwardly directed uniform force *controlled* through a limited distance from within said sleeve along said selected portion having a magnitude sufficient to cause said portion of sleeve and the wall of said conduit in contact therewith to concurrently radially outwardly expand a predetermined and limited distance.

2. A method of repairing a metal tube having a degraded wall section comprising the steps of:

a. inserting an open ended tubular metal sleeve into an open end of said tube, said sleeve being of a length greater than the axial extent of said degraded wall section;

b. positioning said sleeve at a location in which said sleeve is entirely coextensive with and each end extends axially beyond the degraded area of said tube;

c. applying a radially outwardly directed uniform force from within a selected portion of a first end of said sleeve having a magnitude sufficient to cause said portion of sleeve to expand outwardly into substantially circumferentially uniform contact with the inner wall of said conduit, but not sufficient to permanently increase the outer diameter of said tube;

d. applying an additional radially outwardly directed uniform force from within said selected portion of the first end of said sleeve having a magnitude sufficient to cause said portion of sleeve and wall of said tube in contact therewith to concurrently radially outwardly expand a predetermined and limited distance;

e. applying a radially outwardly directed uniform force from within a selected portion of the other end of said sleeve having a magnitude sufficient to cause said portion of sleeve to expand outwardly into substantially circumferentially uniform contact with the inner wall of said tube, but not sufficient to permanently increase the outer diameter of the tube; and f. applying an additional radially outwardly directed uniform force from within said selected portion of the other end of said sleeve having a magnitude sufficient to cause said portion of sleeve and wall of said tube in contact therewith to concurrently radially outwardly expand a predetermined and limited distance.

3. A method of securing a coaxially disposed tubular sleeve within a fluid conduit comprising the steps of:

a. inserting said sleeve into an open end of said conduit;

b. positioning said sleeve in a desired axial position with respect to said conduit; and c. applying [a] *an unopposed* radially outwardly directed uniform force from within said sleeve along a selected axial portion thereof having magnitude sufficient to cause said portion of sleeve to outwardly expand *by confining a pressurized hydraulic fluid within said sleeve along said selective sleeve portion, and thereafter supplying an additional predetermined and controlled fixed volumetric quantity of hydraulic fluid to cause a limited expansion of said conduit* including [applying the force] *controlling the application of the force by internally limiting the distance of application* through [a] *the* predetermined and limited radial distance [thereby also] *including* causing said conduit to *permanently* expand a limited distance.

4. A method of repairing a metal conduit having a degraded wall section comprising the steps of:

a. inserting an open-ended tubular metal sleeve having a length greater than the axial extent of the degraded wall section into an open end of said conduit;

b. positioning said sleeve at a location in which said sleeve is entirely coextensive with and each end extends axially beyond the degraded area of said conduit;

c. applying a radially outwardly directed uniform force from within a selected portion of a first end of said sleeve having a magnitude sufficient to cause said portion of sleeve to radially outwardly expand including applying the force through a predetermined and limited distance thereby causing said conduit in contact therewith to expand a limited distance; and d. applying a radially outwardly directed uniform force from within a selected portion of the other end of said sleeve having a magnitude sufficient to cause said portion of sleeve to radially outwardly expand including applying the force through a predetermined and limited distance thereby also causing said conduit in contact therewith to expand a limited distance.

*5. The method according to claim 1 or 2 wherein:*

*a. the step of applying a radially outwardly directed uniform force along said selected sleeve portion includes supplying a pressurized hydraulic fluid within said sleeve along said selected sleeve portion to a predetermined pressure level; and*

*b. the step of applying the additional radially outward directed uniform force includes supplying additionally a predetermined fixed volumetric quantity of hydraulic fluid to cause the predetermined and limited expansion of said sleeve and conduit portions.*

*6. The method according to claim 4 wherein: the step of applying a radially outwardly directed uniform force along said selected sleeve portion includes confining a pressurizable hydraulic fluid within said sleeve along said selected sleeve portion, and thereafter supplying an additional predetermined and controlled fixed volumetric quantity of hydraulic fluid to cause the limited expansion of said conduit.*

*7. A method according to claim 3 or 4 wherein: the step of supplying the radially outwardly directed uniform force along said selected sleeve portion through a predetermined and limited radial distance includes:*

*a. compressing an elastomer within said sleeve adjacent said selected sleeve portion through a limited axial distance to cause a limited radial expansion of said elastomer and thereby cause the limited expansion of said conduit.*

* * * * *